US008405630B1

United States Patent
Bi et al.

(10) Patent No.: US 8,405,630 B1
(45) Date of Patent: Mar. 26, 2013

(54) TOUCHSCREEN TEXT INPUT

(75) Inventors: Xiaojun Bi, Sunnyvale, CA (US);
Shumin Zhai, Los Altos, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/460,171

(22) Filed: Apr. 30, 2012

Related U.S. Application Data

(60) Provisional application No. 61/623,497, filed on Apr. 12, 2012.

(51) Int. Cl.
G09G 5/00 (2006.01)
(52) U.S. Cl. .......................................... 345/173; 345/168
(58) Field of Classification Search .................. 345/168, 345/169, 173–179
See application file for complete search history.

(56) References Cited

U.S. PATENT DOCUMENTS

2011/0141027 A1* 6/2011 Ghassabian .................. 345/168
2011/0242138 A1 10/2011 Tribble

OTHER PUBLICATIONS

Long Zheng, istartedsomething, "Dissecting the Windows 8 touch UI demo from D9", retrieved at http://www.istartedsomething.com/20110602/dissecting-the-windows-8touch-ui-demo-from-d9/, Jun. 2, 2011, 29 pgs.

* cited by examiner

*Primary Examiner* — Regina Liang
(74) *Attorney, Agent, or Firm* — Shumaker & Sieffert, P.A.

(57) ABSTRACT

A touch-sensitive display of a computing device may concurrently output a first virtual keyboard at a first region and a second virtual keyboard at a second region. The first region may be different from the second region, and the first and second virtual keyboards may display a substantially identical set of virtual keys. The touch-sensitive display may detect a first contact at a first location corresponding to a first character within the first region, and the touch-sensitive display may output the first character. After detecting the first contact, the touch-sensitive display may detect a second contact at a second location corresponding to a second character within the second region, and the touch-sensitive display may output the second character. The touch-sensitive display may output a terminator character in response to determining an absence of any contact within the first and second regions.

17 Claims, 8 Drawing Sheets

TOUCHSCREEN TEXT INPUT

RELATED APPLICATIONS

This application claims the benefit of U.S. Provisional Application No. 61/623,497, filed Apr. 12, 2012, the entire content of which is incorporated herein in its entirety.

BACKGROUND

Users of touch-enabled computing devices may input text by contacting a touch-sensitive display of the computing device to select keys of a virtual keyboard displayed thereon. Based on a variety of factors, such as the physical size/dimensions of the touch-sensitive display, the orientation of the computing device, and/or how a user is currently holding the computing device, it may be cumbersome for the user to input text via a single virtual keyboard.

SUMMARY

In one aspect, the disclosure is directed to a method. The method may include concurrently outputting, at a touch-sensitive display of a computing device, a first virtual keyboard at a first region of the touch-sensitive display and a second virtual keyboard at a second region of the touch-sensitive display, wherein the first region is different from the second region, and wherein the first virtual keyboard and the second virtual keyboard display a substantially identical set of virtual keys. The method may further include detecting a first contact at a first location within the first region of the touch-sensitive display, the first location corresponding to a first character. The method may further include outputting the first character at the touch-sensitive display based on the first contact. The method may further include, after detecting the first contact, detecting a second contact at a second location within the second region of the touch-sensitive display, the second location corresponding to a second character. The method may further include outputting the second character at the touch-sensitive display based on the second contact. The method may further include outputting a terminator character at the touch-sensitive display in response to determining an absence of any contact within the first and second regions of the touch-sensitive display.

In another aspect, the disclosure is directed to a non-transitory computer-readable storage medium containing instructions that, when executed by at least one processor, causes the at least one processor to perform operations. The operations may include concurrently outputting, at a touch-sensitive display of a computing device, a first virtual keyboard at a first region of the touch-sensitive display and a second virtual keyboard at a second region of the touch-sensitive display, wherein the first region is different from the second region, wherein the first keyboard does not display a virtual spacebar key, and wherein the second keyboard does not display the virtual spacebar key. The operations may further include detecting a first contact at a first location within the first region of the touch-sensitive display, the first location corresponding to a first character. The operations may further include outputting the first character at the touch-sensitive display based on the first contact. The operations may further include, after detecting the first contact, detecting a second contact at a second location within the second region of the touch-sensitive display, the second location corresponding to a second character. The operations may further include outputting the second character at the touch-sensitive display based on the second contact. The operations may further include, after outputting the second character, outputting a space character at the touch-sensitive display in response to determining an absence of any contact within the first and second regions of the touch-sensitive display.

In another aspect, the disclosure is directed to a computing device. The computing device may include one or more processors. The computing device may further include a touch-sensitive display. The touch-sensitive display may be configured to concurrently output a first virtual keyboard at a first region of the touch-sensitive display and a second virtual keyboard at a second region of the touch-sensitive display, wherein the first region is different from the second region, and the first virtual keyboard and the second virtual keyboard include a plurality of common virtual keys. The touch-sensitive display may be further configured to detect a first contact at a first location within the first virtual keyboard, the first location corresponding to a first character. The touch-sensitive display may be further configured to output the first character based on the first contact. The touch-sensitive display may be further configured to, after detecting the first contact, detect a second contact at a second location within the second virtual keyboard, the second location corresponding to a second character. The touch-sensitive display may be further configured to output the second character based on the second contact. The touch-sensitive display may be further configured to, after detecting the second contact, detect a third contact at a third location within the first virtual keyboard, the third location corresponding to a third character. The touch-sensitive display may be further configured to output the third character based on the third contact. The touch-sensitive display may be further configured to, after outputting the third character, output a terminator character in response to determining an absence of any contact within the first and second regions of the touch-sensitive display.

The details of one or more aspects of the disclosure are set forth in the accompanying drawings and the description below. Other features, objects, and advantages of the disclosure will be apparent from the description and drawings, and from the claims.

DETAILED DESCRIPTION

Generally, aspects of the disclosure are directed to techniques for receiving text input at a touch-enabled computing device, such as a tablet computer, e-reader, or smartphone. Instead of displaying a single virtual keyboard at a touch-sensitive display, two virtual keyboards may be concurrently displayed. A user may input text into the computing device via the two virtual keyboards by alternating contact (e.g., tap gestures) between the two virtual keyboards to input each character of a word, so that any two consecutive characters in the word are input by alternating contact with virtual keys of the first and second keyboards, respectively.

After at least one of the two virtual keyboards has been contacted to input at least one character, the computing device may input a space character upon detecting that neither of the two virtual keyboards is currently being contacted by an input device (e.g., a stylus and/or user finger). Thus, after the user finishes inputting a word, the user may instruct the computing device to input a space by ceasing to contact either of the two virtual keyboards (by, e.g., lifting the user's fingers off of the touch-sensitive display, or by contacting other areas of the touch-sensitive display).

Figure 1:
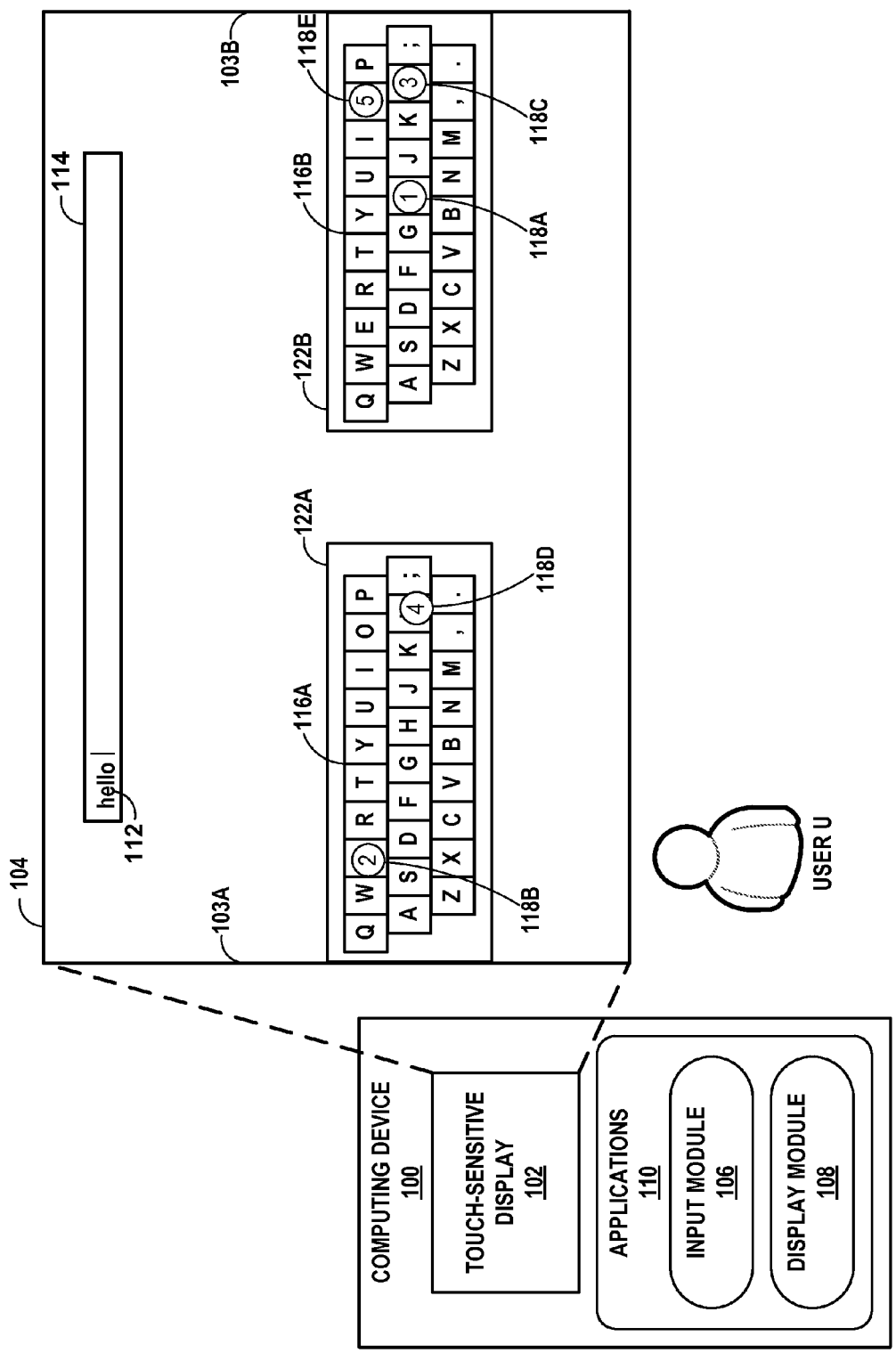
FIG. 1 is a block diagram illustrating a computing device configured to execute one or more applications according to some aspects of the disclosure.

FIG. 1 is a block diagram illustrating a computing device configured to execute one or more applications according to some aspects of the disclosure. As shown in FIG. 1, computing device 100 may include touch-sensitive display 102 and applications 110. Touch-sensitive display 102 may act as both an input and output device for computing device 100. For example, touch-sensitive display 102 may receive input by detecting physical contact and may provide output by graphically displaying content. Touch-sensitive display 102 may display graphical user interface (GUI) 104, which may enable users to interact with computing device 100 through the use of graphical symbols and visual metaphors.

As shown in FIG. 1, user U may contact touch-sensitive display 102 to type on virtual keyboard 116A and virtual keyboard 116B to input text into text area 114.

Computing device 100, in some examples, may include or may be a part of a mobile computing device (e.g., a tablet, a mobile phone, a smart phone, a netbook, a laptop, etc.), a desktop computer, a server system, etc., and may comprise one or more computing devices. Computing device 100 may also connect to a wired and/or a wireless network using a network interface (not shown). An example of computing device 100 is described in further detail with respect to FIG. 2.

Computing device 100 may include one or more input devices that receive user input specifying actions to be performed by computing device 100. Touch-sensitive display 102 may be an input device in computing device 100 that generates one or more signals corresponding to a location on or near the touch-sensitive display 102. In some examples, touch-sensitive display 102 may detect a presence of an input unit, e.g., a finger, pen or stylus that may be in close proximity to—but does not necessarily physically touch—touch-sensitive display 102. As used herein, user "contact" may therefore refer to close proximity that is detected by touch-sensitive display 102. In other examples, user "contact" may include physical contact with touch-sensitive display 102 to select the corresponding location thereon (e.g., in the case of a touch-sensitive screen). Touch-sensitive display 102, in some examples, may generate a signal corresponding to the location of the input unit currently in contact therewith. Signals generated by the selection of the corresponding location(s) may then be provided as data to applications (e.g., application 110 and/or other components of computing device 100).

Computing device 100 may also include one or more output devices that display content to a user (e.g., user U illustrated in FIG. 1). Touch-sensitive display 102 may be an output device in computing device 100 that displays graphical content responsive to electronic signaling or other directives received from computing device 100. Graphical content, generally, may include any visual depiction displayed at touch-sensitive display 102. Examples of graphical content may include images, text, videos, visual objects and/or visual program components such as scroll bars, text boxes, buttons, etc.

Application 110, for example, may direct touch-sensitive display 102 to display graphical user interface (GUI) 104.

Application 110 executing on computing device 100 may include program instructions and/or data that are executable by computing device 100. Examples of application 110 may include a web browser, email application, text messaging application or any other application that receives user input and/or displays graphical content. Application 110 may cause GUI 104 to be displayed at touch-sensitive display 102.

Graphical user interface 104 may include interactive and/or non-interactive graphical content that presents information of computing device 100 in human-readable form. GUI 104 may enable user U to interact with application 110 through touch-sensitive display 102. In this way, GUI 104 may enable user U to create, modify, and/or delete data of computing device 100. GUI 104 may include representations of virtual keyboard 116A and virtual keyboard 116B that are concurrently displayed at touch-sensitive display 102. Concurrently displaying virtual keyboard 116A and virtual keyboard 116B at touch-sensitive display 102 may include displaying both virtual keyboard 116A and virtual keyboard 116B at touch-sensitive display 102 together at touch-sensitive 102, but it may not be necessary for touch-sensitive display 102 to simultaneously start displaying both virtual keyboard 116A and virtual keyboard 116B at the same time. Virtual keyboard 116A and virtual keyboard 116B may each include a plurality of virtual keys, and user U may contact touch-sensitive display 102 to type on virtual keyboard 116A and virtual keyboard 116B to provide input to text area 114 of GUI 104. Text area 114 may be any GUI element that is configured to display text recently processed by application 110 responsive to contact made by user U on portions of touch-sensitive display 102 associated with virtual keyboard 116A and virtual keyboard 116B. Input module 106 of application 110 may process the plurality of contacts detected to direct display module 108 to display input text in text area 114. Alternatively, input module 106 may also direct display module 108 to display input text in any other text area in GUI 104 or any other areas of GUI 104.

Input module 106 of application 110 may be an input method editor (IME) that may receive data from touch-sensitive display 102 describing one or more contacts detected at touch-sensitive display 102. For example, touch-sensitive display 102 may generate a signal that represents locations of touch-sensitive display 102 where contact was detected, and the signal may be sent to input module 106. In some examples, the signal may include a set of coordinates corresponding to a coordinate system used by touch-sensitive display 102 to identify locations of touch-sensitive display 102 where contact was detected. In some examples, touch-sensitive display 102 may include a pressure-sensitive screen that detects an amount of pressure applied in the course of being contacted by user U. In such examples, the signal may include pressure data describing the amount of pressure applied. Input module 106 may process the signal received from touch-sensitive display 102 to identify one or more virtual keys in virtual keyboard 116A or virtual keyboard 116B that were selected in response to/based on the contacts detected at touch-sensitive display 102. In some aspects, input module 106 may be a virtual keyboard library or module linked to or otherwise executed by application 110.

Input module 106 may execute actions specified by the received user input. In some instances execution of one or more such actions may cause display module 108 to update GUI 104. For example, upon input module 106 identifying a contact made by user U at a portion of touch-sensitive display 102 associated with a virtual key in virtual keyboard 116A or virtual keyboard 116B, input module 106 may execute an action to determine the character associated with the contacted virtual key and to direct display module 108 to input the character associated with the virtual key into text area 114 (i.e., output the character at touch-sensitive display 102.

Virtual keyboard 116A and virtual keyboard 116B may be concurrently displayed at touch-sensitive display 102. Virtual keyboard 116A may be displayed at region 122A of touch-sensitive display 102 and virtual keyboard 116B may be displayed at region 122B of touch-sensitive display 102. In some examples, virtual keyboard 116A may encompass the entire area of region 122A, and virtual keyboard 116B may encompass the entire area of region 122B. In other examples, virtual keyboard 116A may encompass a sub-portion of the area of region 122A and virtual keyboard 116B may encompass a sub-portion of the area of region 122B. In some examples, more than two virtual keyboards may be concurrently displayed at touch-sensitive display 102.

Region 122A of touch-sensitive display 102 may be different from region 122B of touch-sensitive display 102. For example, region 122A may encompass a different area of touch-sensitive display 102 than region 122B, and region 122A may not overlap with region 122B. For example, region 122A may be located against or adjacent to an edge 103A of touch-sensitive display 102, and region 122B may be located against or adjacent to an edge 103B of touch-sensitive display 102 that is opposite of the edge to which region 122A is adjacent or near. In this way, user U may be able to grasp the physical body of computing device 100 near edges 103A and 103B of touch-sensitive display 102, and may contact virtual keyboards 116A and 116B using user U's fingers to input text into text area 114.

Virtual keyboard 116A and virtual keyboard 116B may each display a plurality of virtual keys corresponding to a plurality of characters. Virtual keyboard 116A and virtual keyboard 116B, in some examples, may display a plurality of common or identical virtual keys. In some examples, virtual keyboard 116A and virtual keyboard 116B may display an identical set of virtual keys, such as by displaying the same set of twenty six virtual keys that correspond to all 26 characters in the English alphabet. In some examples, virtual keyboard 116A and virtual keyboard 116B may display a substantially identical set of virtual keys, in that a majority of virtual keys in virtual keyboard 116A are identical to a majority of virtual keys in virtual keyboard 116B. In some examples, virtual keyboard 116A and 116B may each be a corresponding half of a keyboard, such as a corresponding half of a QWERTY keyboard, so that virtual keyboard 116A and virtual keyboard 116B may not have any identical virtual keys. In some examples, virtual keyboard 116A and virtual keyboard 116B may both include QWERTY keyboards. In some examples, virtual keyboard 116A and virtual keyboard 116B may also be Dvorak keyboards or keyboards having any other suitable keyboard layout.

User U may alternate between typing on virtual keyboards 116A and 116B in order to input text into text area 114, so that one of the virtual keyboards 116A and 116B may not be used by user U to input two consecutive letters of a word into text area 114. For example, user U may contact either virtual keyboard 116A or virtual keyboard 116B to input a first character of a word into text area 114. To input a second character of the word into text area 114, user U may contact the virtual keyboard that was not used to input the first character into text area 114, thereby alternating between using virtual keyboard 116A and using virtual keyboard 116B to input each successive character of the word into text area 114.

For example, to input the word "hello" 112 into text area 114, user U may initially contact virtual keyboard 116B at location 118A, which may correspond to an "h" virtual key, to input "h" into text area 114. Touch-sensitive display 102 may detect the contact at location 118A of virtual keyboard 116B and, in response, may output the character "h" corresponding to location 118A.

Subsequent to inputting "h" into text area 114, user U may—while maintaining contact with virtual keyboard 116B at location 118A—contact virtual keyboard 116A at location 118B (which may correspond to an "e" virtual key, to input "e" into text area 114). Touch-sensitive display 102 may detect the contact at location 118B of virtual keyboard 116A and, in response, may output the character "e" corresponding to location 118B.

As discussed above, after at least one of virtual keyboards 116A and 116B has been contacted to input at least one character into text area 114, computing device 100 may input a space character or a punctuation mark into text area 114 in response to determining an absence of contact within both virtual keyboards 116A and 116B. Thus, user U may continue to contact location 118A within virtual keyboard 116B until user U contacts location 118B within virtual keyboard 116A. The contact by user U at location 118A may be continuously detected by touch-sensitive display 102 until after the contact by user U at location 118B is detected by touch-sensitive display 102, so that touch-sensitive display 102 may continually detect contact within at least one of region 122A and region 122B of touch-sensitive display 102 while user U is inputting the word "hello" 112 into text area 114.

Subsequent to inputting "e" into text area 114, user U may contact virtual keyboard 116B at location 118C, which may correspond to an "l" virtual key, to input "l" into text area 114. Touch-sensitive display 102 may detect the contact at location 118C of virtual keyboard 116B and, in response, may output the character "l" corresponding to location 118C. Once again, user U may continue to contact location 118B within virtual keyboard 116A until user U contacts location 118C within virtual keyboard 116B. The contact by user U at location 118B may be continuously detected by touch-sensitive display 102 until after the contact by user U at location 118C is detected by touch-sensitive display 102, so that touch-sensitive display 102 may continually detect contact within at least one of region 122A and region 122B of touch-sensitive display 102 while user U is inputting the word "hello" 112 into text area 114.

Subsequent to inputting "l" into text area 114, user U may contact virtual keyboard 116A at location 118D, which may correspond to an "l" virtual key, to input "l" into text area 114. Touch-sensitive display 102 may detect the contact at location 118D of virtual keyboard 116A and, in response, may output the character "l" corresponding to location 118D. User U may continue to contact location 118C within virtual keyboard 116B until user U contacts location 118D within virtual keyboard 116A. The contact by user U at location 118C may be continuously detected by touch-sensitive display 102 until after the contact by user U at location 118D is detected by touch-sensitive display 102, so that touch-sensitive display 102 may continually detect contact within at least one of region 122A and region 122B of touch-sensitive display 102 while user U is inputting the word "hello" 112 into text area 114.

Subsequent to inputting "l" into text area 114, user U may contact virtual keyboard 116B at location 118E, which may correspond to an "o" virtual key, to input "o" into text area 114 and complete the word "hello" in text area 114. Touch-sensitive display 102 may detect the contact at location 118E of virtual keyboard 116B and, in response, may output the character "o" corresponding to location 118E. User U may continue to contact location 118D within virtual keyboard 116A until user U contacts location 118E within virtual keyboard 116B. The contact by user U at location 118D may be continuously detected by touch-sensitive display 102 until after the contact by user U at location 118E is detected by touch-sensitive display 102, so that touch-sensitive display 102 may continually detect contact within at least one of region 122A and region 122B of touch-sensitive display 102 while user U is inputting the word "hello" 112 into text area 114.

After completely inputting the word "hello" into text area 114 by typing on virtual keyboard 116A and virtual keyboard 116B, user 320 may no longer contact either virtual keyboard 116A or virtual keyboard 116B, such as by lifting his fingers off of touch-sensitive display 102, or by contacting other locations of touch-sensitive display 102. Touch-sensitive display 102 may determine an absence of contact within both first region 122A and second region 122B and, in response, may output a terminator character, such as a space character, including inputting the terminator character into text area 114. Terminator characters, in some examples, may include but are not limited to a space character and punctuation marks, such as periods, commas, colons, semi-colons, parentheses, quotation marks, exclamation points, question marks, and the like.

Because determining an absence of any contact within first region 122A and second region 122B may cause a terminator character to be outputted at touch-sensitive display 102, virtual keyboards 116A and 116B, in some examples, may not display virtual keys associated with one or more terminator characters. For example, virtual keyboards 116A and 116B may not display a virtual spacebar key because determining the absence of any contact within both virtual keyboard 116A and virtual keyboard 116B may cause a space character to be outputted at touch-sensitive display 102.

After outputting the terminator character in response to determining an absence of contact within first region 122A and second region 122B of touch-sensitive display 102, user U may be able to input a first character of a second word after "hello" into text area 114 by contacting a virtual key displayed in either virtual keyboard 116A or virtual keyboard 116B regardless of the virtual keyboard that was used to input the last character "o" of the word "hello" into text area 114. Touch-sensitive display 102 may detect the contact made by the user at a location corresponding to a character within either region 122A or region 122B, and that character may be outputted at touch-sensitive display 102 based on the location.

In some examples, if user U does not contact either region 122A or region 122B, such as by lifting his fingers off of the surface of touch-sensitive display 102, but re-contacts either region 122A or 122B within a specified amount of time (e.g., within 1 second, within 0.5 second, or within 0.25 second), no terminator character may be inputted into text area 114 in response to the absence of contact within region 122A and region 122B.

Figure 2:
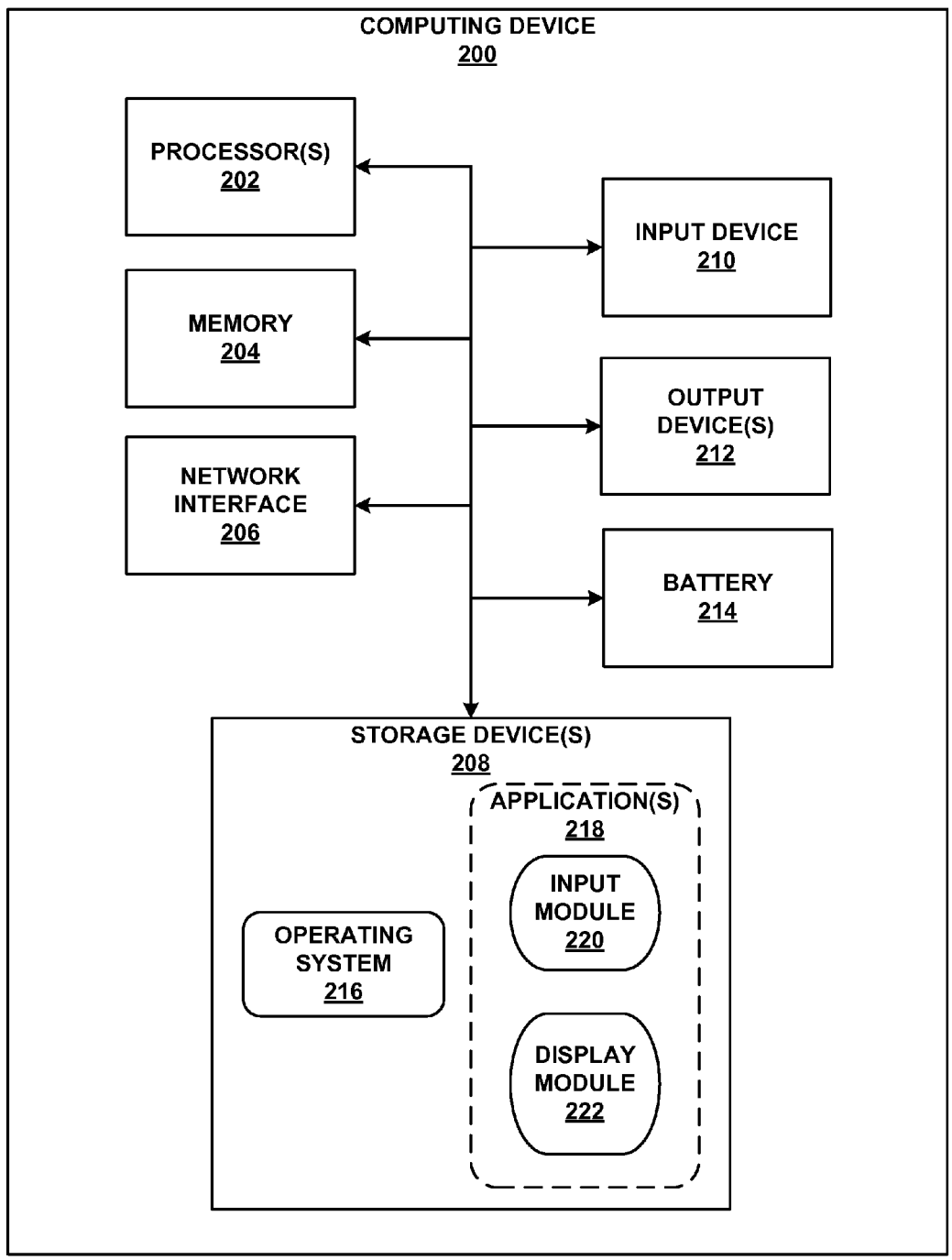
FIG. 2 is a block diagram illustrating further details of one example of computing device 200 according to some aspects of the present disclosure.

FIG. 2 is a block diagram illustrating further details of one example of computing device 200, such as computing device 100 shown in FIG. 1, according to some aspects of the present disclosure. FIG. 2 illustrates only one particular example of computing device 200. Many other example embodiments of computing device 200 may be used in other instances.

As shown in the specific example of FIG. 2, computing device 200 may include one or more processors 202, memory 204, a network interface 206, one or more storage devices 208, input device 210, one or more output devices 212, and battery 214. Computing device 200 may also include an operating system 216. Computing device 200, in one example, may further include one or more applications 218. One or more applications 218 may also be executable by computing device 200. Components of computing device 200 may be interconnected (physically, communicatively, and/or operatively) for inter-component communications.

One or more processors 202, in one example, may implement functionality and/or process instructions for execution within computing device 200. For example, one or more processors 202 may be capable of processing instructions stored in memory 204 and/or instructions stored on one or more storage devices 208, such as instructions of one or more applications 218 stored in memory 204 or one or more storage devices 208.

Memory 204, in one example, may store information within computing device 200 during operation. Memory 204, in some examples, may represent a computer-readable storage medium. In some examples, memory 204 may be a temporary memory, meaning that a primary purpose of memory 204 may not be long-term storage. Memory 204, in some examples, may be described as a volatile memory, meaning that memory 204 may not maintain stored contents when computing device 200 is turned off. Examples of volatile memories may include random access memories (RAM), dynamic random access memories (DRAM), static random access memories (SRAM), and other forms of volatile memories known in the art. In some examples, memory 204 may be used to store program instructions for execution by one or more processors 202. Memory 204, in one example, may be used by software or applications running on computing device 200 (e.g., one or more applications 218) to temporarily store data and/or instructions during program execution.

One or more storage devices 208, in some examples, may also include one or more computer-readable storage media. One or more storage devices 208 may be configured to store larger amounts of information than memory 204. One or more storage devices 208 may further be configured for long-term storage of information. In some examples, one or more storage devices 208 may include non-volatile storage elements. Examples of such non-volatile storage elements may include magnetic hard disks, optical discs, floppy disks, Flash memories, or forms of electrically programmable memories (EPROM) or electrically erasable and programmable (EEPROM) memories. In some examples, operating system 216 and one or more applications 218 may be stored in one or more storage devices 208.

Computing device 200, in some examples, may also include a network interface 206. Computing device 200, in such examples, may use network interface 206 to communicate with external devices via one or more networks, such as one or more wired or wireless networks. Network interface 206 may be a network interface card, such as an Ethernet card, an optical transceiver, a radio frequency transceiver, or any other type of device that can send and receive information. Other examples of such network interfaces may include Bluetooth®, 3G and WiFi® radios in mobile computing devices as well as USB. In some examples, computing device 200 may use network interface 206 to wirelessly communicate with an external device (not shown) such as a server, mobile phone, or other networked computing device.

Computing device 200 may also include one or more input devices 210. Input device 210, in some examples, may be configured to receive input from a user through tactile, electromagnetic, audio, and/or video feedback. Examples of input device 210 may include a touch-sensitive display (e.g., touch-sensitive display 102 shown in FIG. 1), mouse, keyboard, voice responsive system, video camera, microphone or any other type of device for detecting gestures by a user. In some examples, a touch-sensitive display may include a presence-sensitive screen.

One or more output devices 212 may also be included in computing device 200. One or more output devices 212, in some examples, may be configured to provide output to a user using tactile, audio, or video stimuli. One or more output devices 212, in one example, may include a display (e.g., touch-sensitive display 102 shown in FIG. 1), sound card, a video graphics adapter card, or any other type of device for converting a signal into an appropriate form understandable to humans or machines. Additional examples of one or more output device 212 may include a speaker, a cathode ray tube (CRT) monitor, a liquid crystal display (LCD), or any other type of device that can generate intelligible output to a user.

Computing device 200, in some examples, may include a battery 214, which may be rechargeable and provide power to computing device 200. Battery 214, in some examples, may be made from nickel-cadmium, lithium-ion, fuel cells, or other suitable material.

Examples of computing device 200 may include operating system 216. Operating system 216 may control the operation of components of computing device 200. For example, operating system 216 may facilitate the interaction of one or more applications 218, such as application 110 shown in FIG. 1, with hardware components of computing device 200.

As shown in FIG. 2, one or more applications 218 may include an example input module 220, such as input module 106 shown in FIG. 1, and display module 222, such as display module 108 shown in FIG. 1. Input module 220 and display module 222 may each include program instructions and/or data that are executable by one or more processors 202 of computing device 200. For example, input module 220 may include instructions that cause one or more applications 218 executing on computing device 200 to perform one or more of the operations and actions described in FIG. 1. Similarly, display module 222 may include instructions that cause one or more applications 218 executing on computing device 200 to perform one or more of the operations and actions described in FIG. 1.

In some examples, input module 220 and/or display module 222 may be a part of operating system 216 executing on computing device 200. In some examples, input module 220 may receive input from input device 210 of computing device 200.

Any applications, e.g., one or more applications 218, implemented within or executed by computing device 200 may be implemented or contained within, operable by, executed by, and/or be operatively/communicatively coupled to components of computing device 200, e.g., one or more processors 202, memory 204, network interface 206, one or more storage devices 208, input device 210, and one or more output devices 212.

Figure 3A:
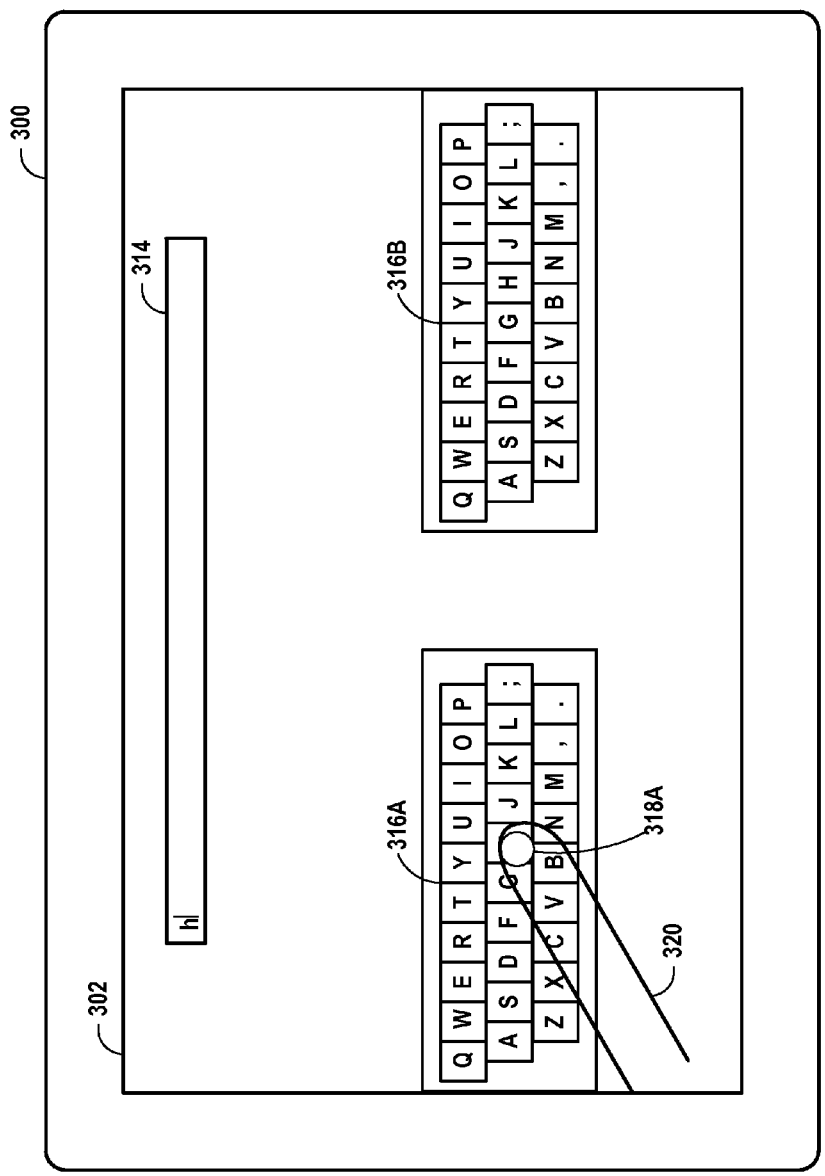
FIGS. 3A-3E are conceptual diagrams illustrating techniques for inputting text at a touch-sensitive display of a computing device according to some aspects of the disclosure.

FIGS. 3A-3E are conceptual diagrams illustrating techniques for inputting text at a touch-sensitive display of a computing device according to some aspects of the disclosure. As shown in FIG. 3A, computing device 300 may include touch-sensitive display 302. Touch-sensitive display 302 may concurrently display virtual keyboard 316A and virtual keyboard 316B. User 320 may input text into text area 314 displayed at touch-sensitive display 302 by contacting locations of touch-sensitive display 302 corresponding to virtual keys included in virtual keyboard 316A and virtual keyboard 316B.

User 320 may contact location 318A corresponding to a virtual "h" key of virtual keyboard 316A to input "h" into text area 314. In some examples, instead of contacting location 318A corresponding to a virtual "h" key of virtual keyboard 316A, user 320 may instead contact a location corresponding to a virtual "h" key of virtual keyboard 316B. Thus, user 320 may be able to use either virtual keyboard 316A or virtual keyboard 316B to input a first letter of a word into text area 314.

Figure 3B:
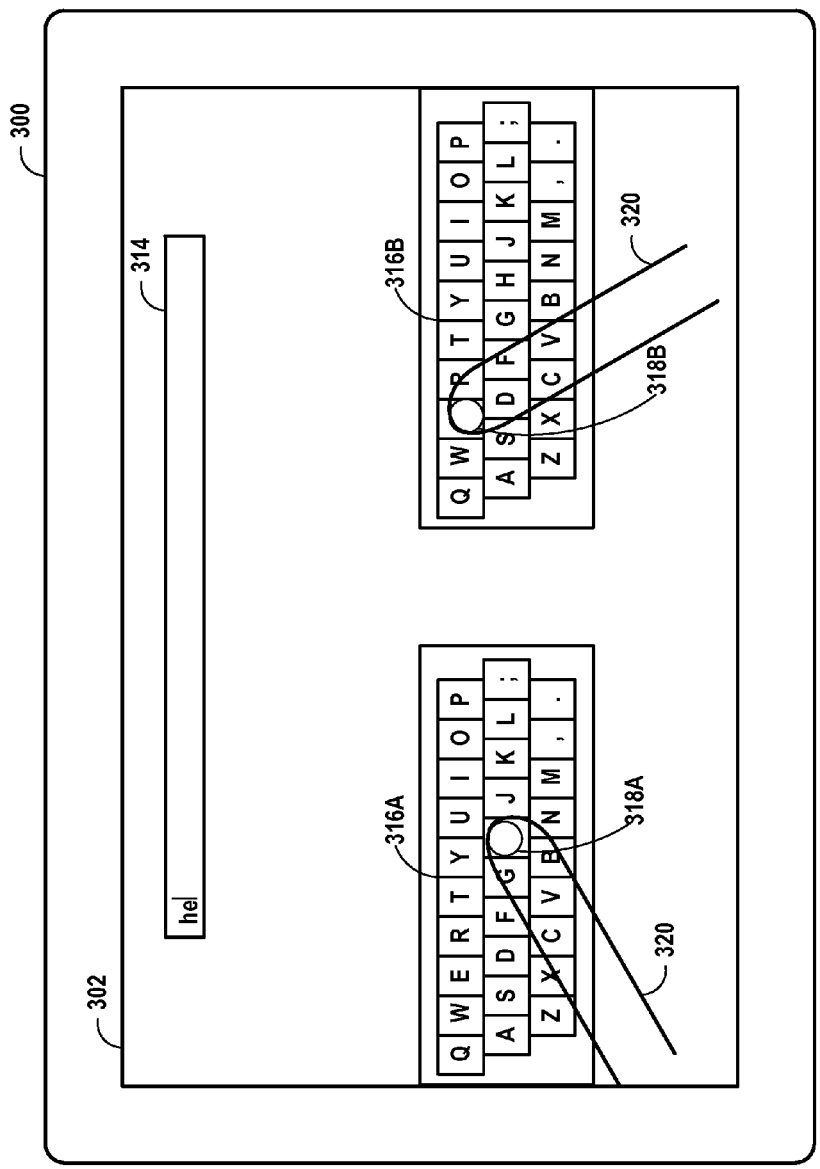

As shown in FIG. 3B, after inputting "h" into text area 314, user 320 may alternate virtual keyboards to input the next character into text area 314 by contacting virtual keyboard 316B. User 320 may contact location 318B corresponding to a virtual "e" key of virtual keyboard 316B to input "e" into text area 314. Because user 320 may be required to keep in contact with at least one of virtual keyboard 316A and virtual keyboard 316B in order to prevent a terminator character from being inputted into text area 314, user 320 may continue to contact location 318A in virtual keyboard 316A until user 320 contacts location 318B in virtual keyboard 316B.

Figure 3C:
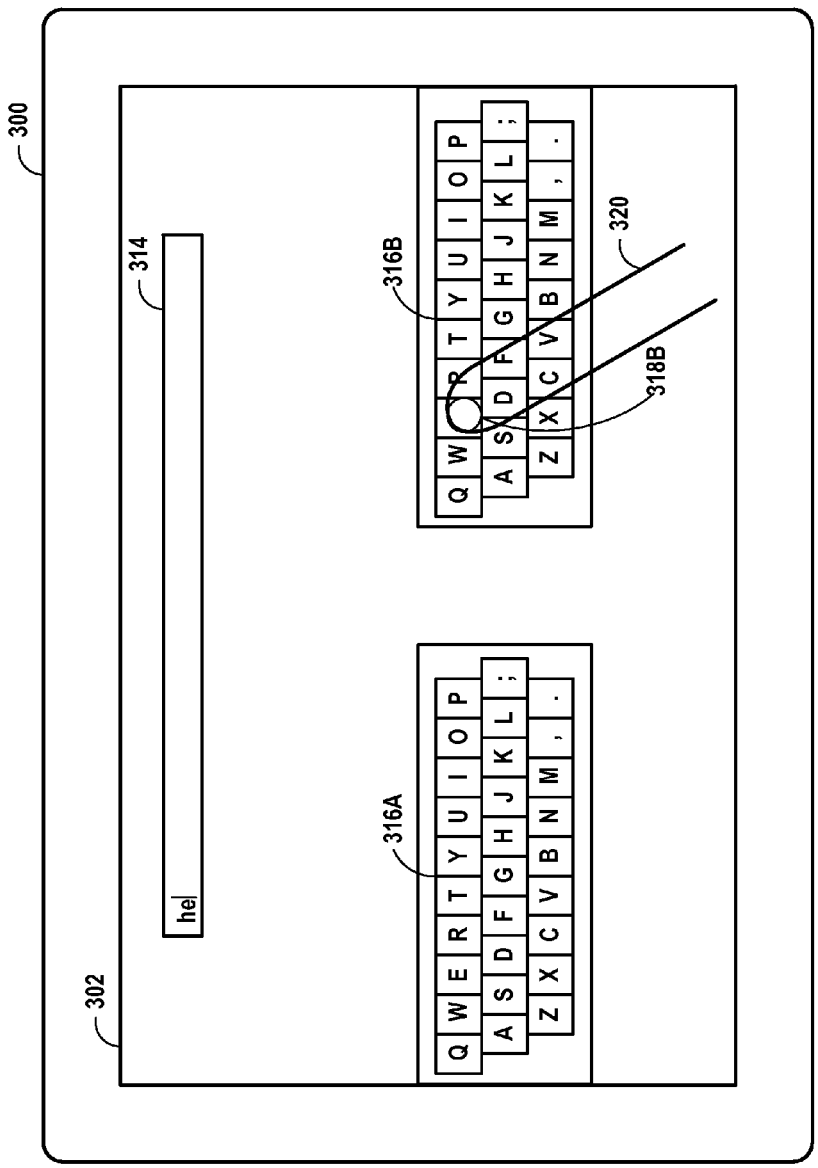

As shown in FIG. 3C, after user 320 contacts location 318B in virtual keyboard 316B, user 320 may be able to discontinue contacting virtual keyboard 316A. For example, user 320 may lift his finger from touch-sensitive display 302 in preparation of contacting another virtual key in virtual keyboard 316A to input a subsequent character into text area 314.

Figure 3D:
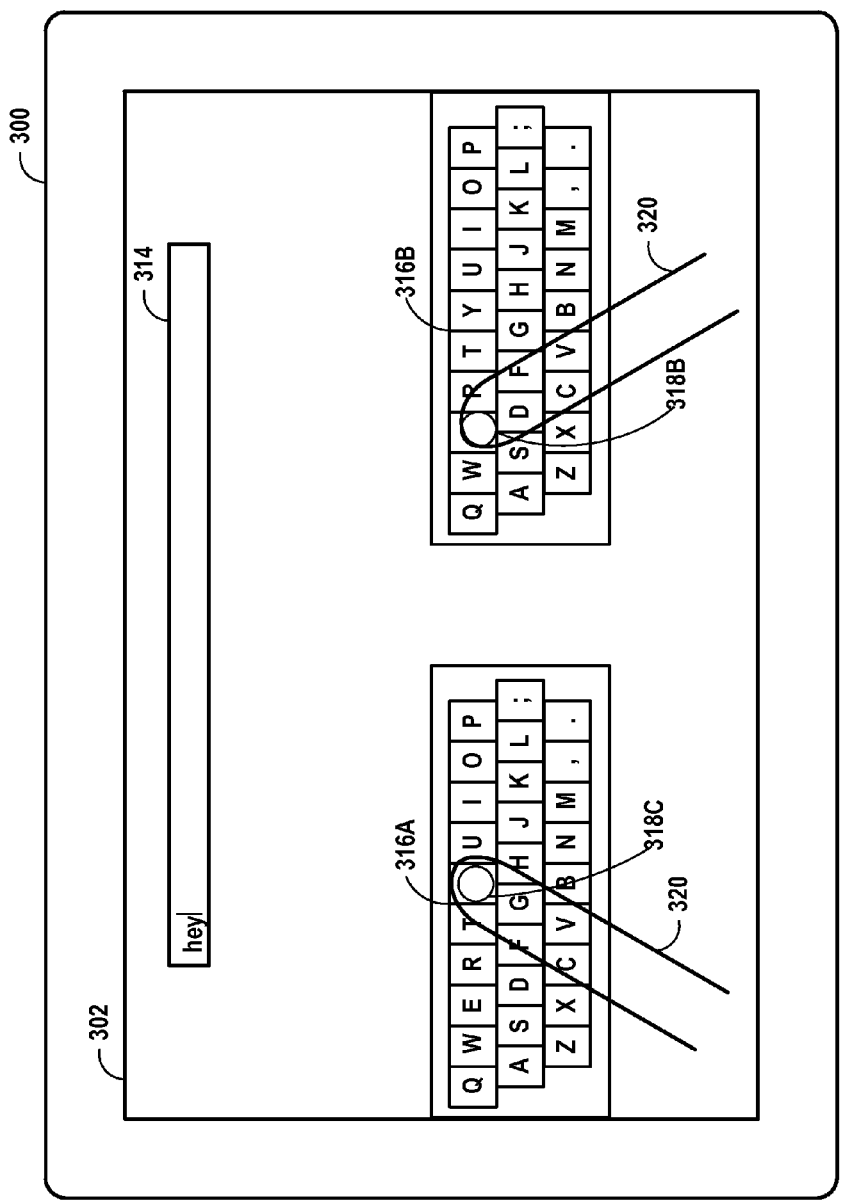

As shown in FIG. 3D, after inputting "e" into text area 314, user 320 may alternate virtual keyboards to type the next character into text area 314 by contacting virtual keyboard 316A. User 320 may contact location 318C corresponding to a virtual "y" key of virtual keyboard 316A to input "y" into text area 314. Because at least one of virtual keyboard 316A and virtual keyboard 316B may need to be contacted in order to prevent a terminator character from being inputted into text area 314, user 320 may continue to contact location 318B in virtual keyboard 316B until user 320 contacts location 318C in virtual keyboard 316A.

Figure 3E:
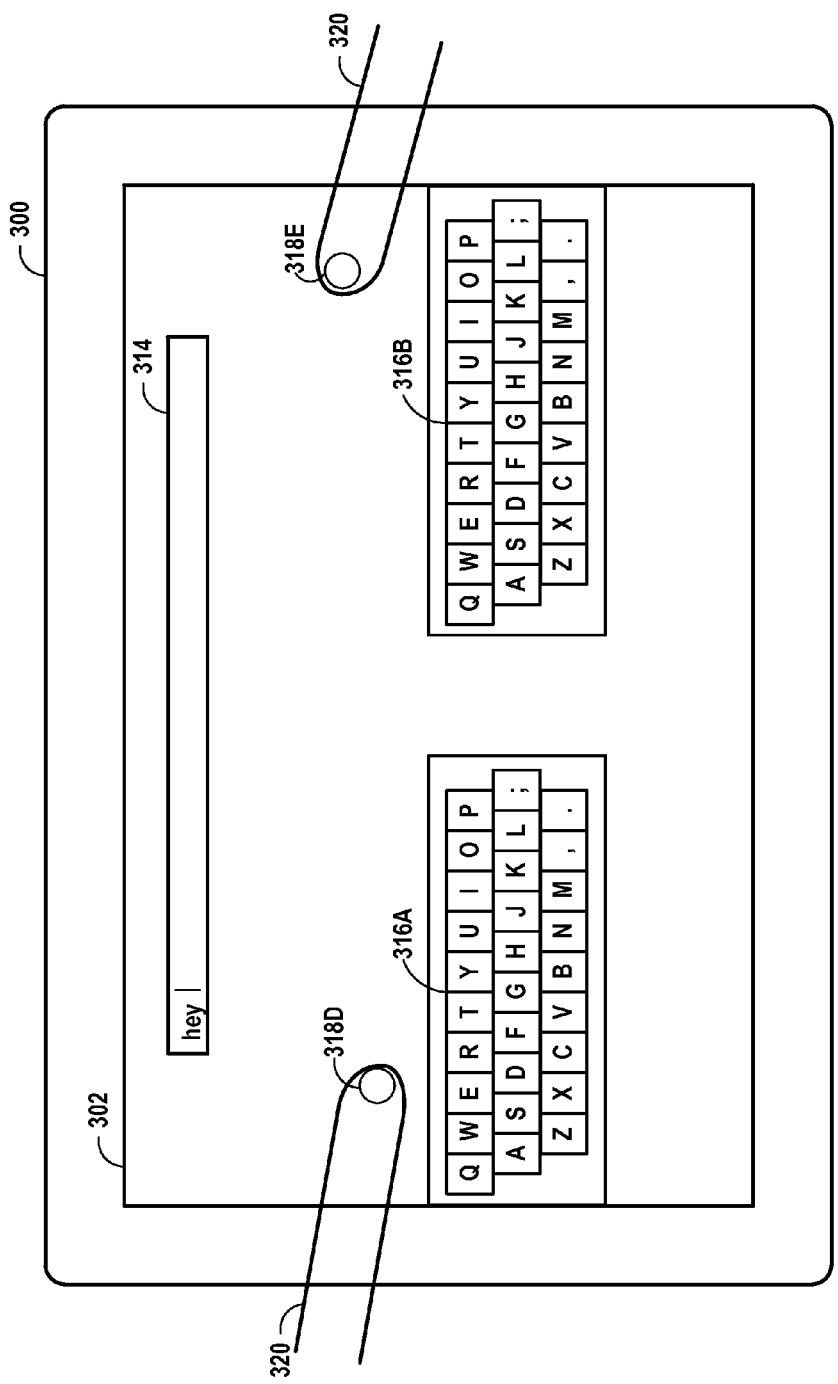

As shown in FIG. 3E, after inputting "y" into text area 314, user 320 may have completed the word "hey" into text area 314. Accordingly, user 320 may discontinue all contact with virtual keyboard 316A and virtual keyboard 316B by, for example, contacting location 318D and location 318E that are not within virtual keyboard 316A or virtual keyboard 316B. In response to determining an absence of any contact within virtual keyboard 316A and virtual keyboard 316B, a terminator character, such as a space character may be inputted into text area 314 after the word "hey".

After a terminator character is inputted into text area 314, user 320 may contact locations within either virtual keyboard 316A or virtual keyboard 316B to input another character to form another word into text area 314. Therefore, although user 320 contacted virtual keyboard 316A to input "y" into text area 314, it may not be necessary for user 320 to alternate from virtual keyboard 316A and contact virtual keyboard 316B to input to enter a subsequent character into text area 314 if an intervening terminator character is inputted into text area 314 in response to determining an absence of contact within both virtual keyboard 316A and virtual keyboard 316B after "y" was inputted into text area 314.

Figure 4:
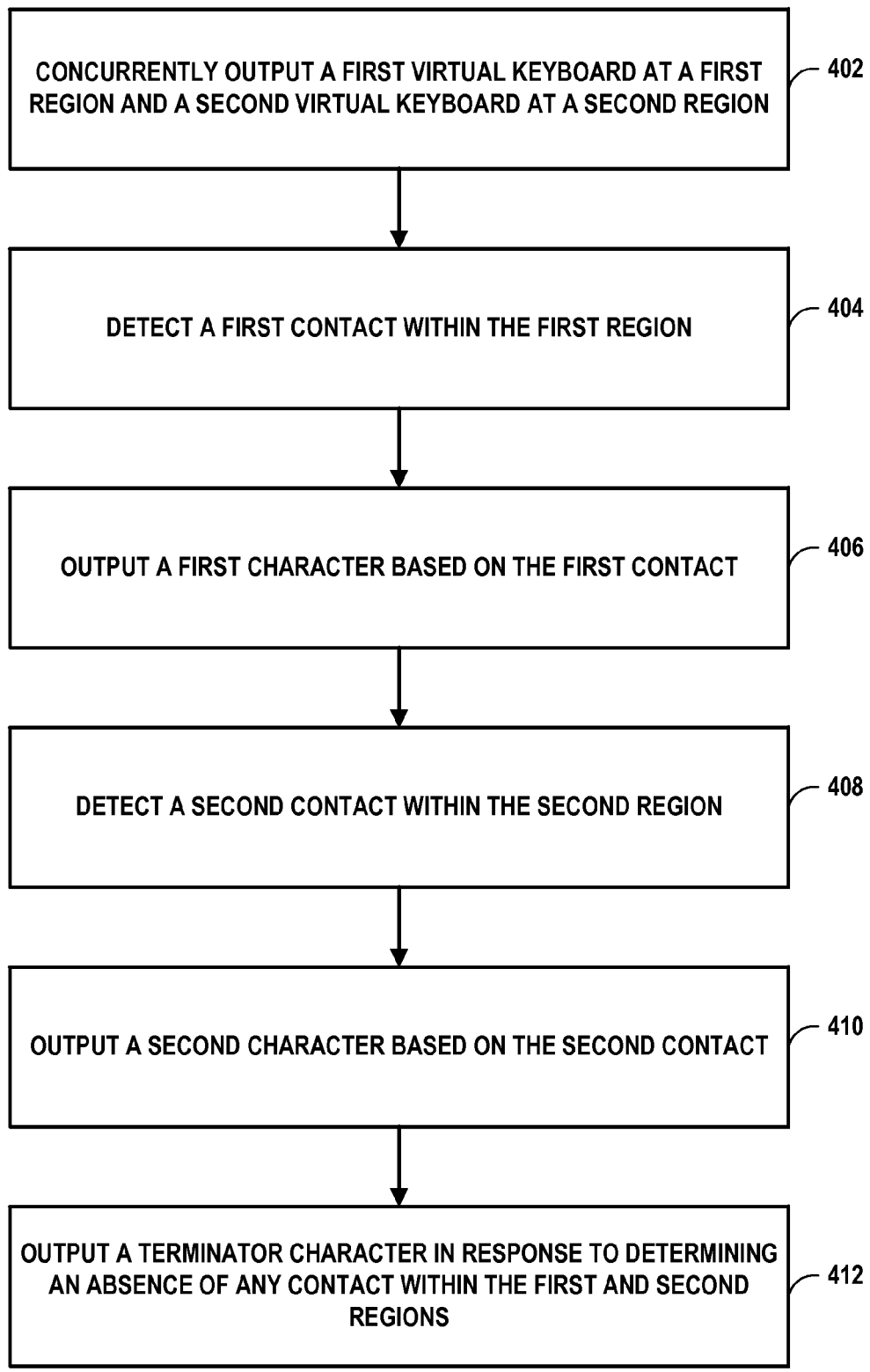
FIG. 4 is a flowchart illustrating an example operation of a method for inputting text at a touch-sensitive display of a computing device according to some aspects of the disclosure.

FIG. 4 is a flow chart illustrating an example operation of a method for inputting text at a touch-sensitive display of a computing device according to some aspects of the disclosure. The method may include concurrently outputting, at a touch-sensitive display of a computing device, a first virtual keyboard at a first region of the touch-sensitive display and a second virtual keyboard at a second region of the touch-sensitive display, wherein the first region is different from the second region, and wherein the first virtual keyboard and the second virtual keyboard display an identical set of virtual keys (402). The method may further include detecting a first contact at a first location within the first region of the touch-sensitive display, the first location corresponding to a first character (404). The method may further include outputting the first character at the touch-sensitive display based on the first contact (406). The method may further include after detecting the first contact, detecting a second contact at a second location within the second region of the touch-sensitive display, the second location corresponding to a second character (408). The method may further include outputting the second character at the touch-sensitive display based on the second contact (410). The method may further include outputting a terminator character at the touch-sensitive display in response to determining an absence of any contact within the first and second regions of the touch-sensitive display (412).

In some examples, the first virtual keyboard may include a QWERTY keyboard and the second virtual keyboard may include a QWERTY keyboard. In some examples, terminator character may include at least one of a space character and a punctuation mark. In some examples, the terminator character may include a space character, the first virtual keyboard may not display a virtual spacebar key, and the second virtual keyboard may not display the virtual spacebar key. In some examples, the method may further include, after outputting the terminator character, detecting a third contact at a third location within either the first region or the second region of the touch-sensitive display, the third location corresponding to a third character. In some examples, the method may further include outputting the third character at the touch-sensitive display based on the third contact. In some examples, detecting the first contact may further include continuously detecting the first contact until after the second contact is detected.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various aspects of the disclosure have been described. These and other embodiments are within the scope of the following claims.

The invention claimed is:

1. A method comprising:
concurrently outputting, at a touch-sensitive display of a computing device, a first virtual keyboard at a first region of the touch-sensitive display and a second virtual keyboard at a second region of the touch-sensitive display, wherein the first region is different from the second region, and wherein the first virtual keyboard and the second virtual keyboard display a substantially identical set of virtual keys;
detecting a first contact at a first location within the first region of the touch-sensitive display, the first location corresponding to a first character;
outputting the first character at the touch-sensitive display based on the first contact;
after detecting the first contact, detecting a second contact at a second location within the second region of the touch-sensitive display, the second location corresponding to a second character;
outputting the second character at the touch-sensitive display based on the second contact; and
outputting a terminator character at the touch-sensitive display in response to determining an absence of any contact within the first and second regions of the touch-sensitive display, irrespective of any contact detected at the touch-sensitive display outside of the first region and the second region of the touch-sensitive display.

2. The method of claim 1, wherein:
the first virtual keyboard comprises a QWERTY keyboard; and
the second virtual keyboard comprises a QWERTY keyboard.

3. The method of claim 1, wherein the terminator character comprises at least one of a space character and a punctuation mark.

4. The method of claim 3, wherein:
the terminator character comprises a space character;
the first virtual keyboard does not display a virtual spacebar key; and
the second virtual keyboard does not display the virtual spacebar key.

5. The method of claim 1 further comprising:
after outputting the terminator character, detecting a third contact at a third location within either the first region or the second region of the touch-sensitive display, the third location corresponding to a third character; and
outputting the third character at the touch-sensitive display based on the third contact.

6. The method of claim 1, wherein detecting the first contact further comprises:
continuously detecting the first contact until after the second contact is detected.

7. A non-transitory, computer-readable storage medium containing instructions that, when executed by at least one processor, causes the at least one processor to perform operations comprising:
concurrently outputting, at a touch-sensitive display of a computing device, a first virtual keyboard at a first region of the touch-sensitive display and a second virtual keyboard at a second region of the touch-sensitive display, wherein the first region is different from the second region, wherein the first keyboard does not display a virtual spacebar key, and wherein the second keyboard does not display the virtual spacebar key;

detecting a first contact at a first location within the first region of the touch-sensitive display, the first location corresponding to a first character;

outputting the first character at the touch-sensitive display based on the first contact;

after detecting the first contact, detecting a second contact at a second location within the second region of the touch-sensitive display, the second location corresponding to a second character;

outputting the second character at the touch-sensitive display based on the second contact; and after outputting the second character, outputting a space character at the touch-sensitive display in response to determining an absence of any contact within the first and second regions of the touch-sensitive display, irrespective of any contact detected at the touch-sensitive display outside of the first region and the second region of the touch-sensitive display.

8. The computer-readable storage medium of claim 7, wherein:
the first virtual keyboard includes a QWERTY keyboard; and
the second virtual keyboard includes a QWERTY keyboard.

9. The computer-readable storage medium of claim 7, wherein the first virtual keyboard and the second virtual keyboard display an identical set of virtual keys.

10. The computer-readable storage medium of claim 7, wherein the operations further comprise:
after outputting the space character, detecting a third contact at a third location within either the first region or the second region of the touch-sensitive display, the third location corresponding to a third character; and
outputting the third character at the touch-sensitive display based on the third contact.

11. The computer-readable storage medium of claim 7, wherein detecting the first contact further comprises:
continuously detecting the first contact until after the second contact is detected.

12. A computing device comprising:
one or more processors; and
a touch-sensitive display configured to:
concurrently output a first virtual keyboard at a first region of the touch-sensitive display and a second virtual keyboard at a second region of the touch-sensitive display, wherein the first region is different from the second region, and the first virtual keyboard and the second virtual keyboard include a plurality of identical virtual keys;
detect a first contact at a first location within the first virtual keyboard, the first location corresponding to a first character;
output the first character based on the first contact;
after detecting the first contact, detect a second contact at a second location within the second virtual keyboard, the second location corresponding to a second character;
output the second character based on the second contact;
after detecting the second contact, detect a third contact at a third location within the first virtual keyboard, the third location corresponding to a third character;
output the third character based on the third contact; and
after outputting the third character, output a terminator character in response to determining an absence of any contact within the first and second regions of the touch-sensitive display, irrespective of any contact detected at the touch-sensitive display outside of the first region and the second region of the touch-sensitive display.

13. The computing device of claim 12, wherein the first virtual keyboard and the second virtual keyboard display an identical set of virtual keys.

14. The computing device of claim 13, wherein:
the first virtual keyboard includes a QWERTY keyboard; and
the second virtual keyboard includes a QWERTY keyboard.

15. The computing device of claim 12, wherein:
the first virtual keyboard does not include a virtual key associated with the terminator character; and
the second virtual keyboard does not include the virtual key associated with the terminator character.

16. The computing device of claim 12, wherein the terminator character comprises at least one of a space character and a punctuation mark.

17. The computing device of claim 12, wherein the touch-sensitive display is further configured to:
continuously detect the first contact until after the second contact is detected; and
continuously detect the second contact until after the third contact is detected.

* * * * *